(12) United States Patent
Ingram et al.

(10) Patent No.: US 11,173,446 B2
(45) Date of Patent: Nov. 16, 2021

(54) PROCESS FOR REMOVAL OF ACID GASES FROM A FLUID STREAM

(71) Applicants: BASF SE, Ludwigshafen am Rhein (DE); ExxonMobil Research and Engineering Company, East Annandale, NJ (US)

(72) Inventors: Thomas Ingram, Ludwigshafen am Rhein (DE); Martin Ernst, Ludwigshafen am Rhein (DE); Gerald Vorberg, Ludwigshafen am Rhein (DE); Alexander Panchenko, Ludwigshafen am Rhein (DE); Sophia Ebert, Ludwigshafen am Rhein (DE); Thomas Wesley Holcombe, Ludwigshafen am Rhein (DE); Michael Siskin, Westfield, NJ (US); Carla Pereira, Bridgewater, NJ (US); Georg Sieder, Ludwigshafen am Rhein (DE)

(73) Assignees: BASF SE, Ludwigshafen am Rhein (DE); ExxonMobil Research and Engineering Company, Annandale, NJ (US)

( * ) Notice: Subject to any disclaimer, the term of this patent is extended or adjusted under 35 U.S.C. 154(b) by 173 days.

(21) Appl. No.: 16/484,860

(22) PCT Filed: Feb. 9, 2018

(86) PCT No.: PCT/EP2018/053235
§ 371 (c)(1),
(2) Date: Aug. 9, 2019

(87) PCT Pub. No.: WO2018/146233
PCT Pub. Date: Aug. 16, 2018

(65) Prior Publication Data
US 2019/0381448 A1  Dec. 19, 2019

(30) Foreign Application Priority Data
Feb. 10, 2017  (EP) .................................... 17155535

(51) Int. Cl.
*B01D 53/14* (2006.01)
*B01D 53/52* (2006.01)
*B01D 53/78* (2006.01)
*B01D 53/96* (2006.01)

(52) U.S. Cl.
CPC ..... *B01D 53/1493* (2013.01); *B01D 53/1425* (2013.01); *B01D 53/1468* (2013.01); *B01D 53/52* (2013.01); *B01D 53/78* (2013.01); *B01D 53/96* (2013.01); *B01D 2252/20405* (2013.01); *B01D 2252/20426* (2013.01); *B01D 2252/20447* (2013.01); *B01D 2252/20489* (2013.01); *B01D 2252/602* (2013.01)

(58) Field of Classification Search
CPC ........... B01D 2252/20405; B01D 2252/20426; B01D 53/78; B01D 53/1456; B01D 53/52; B01D 53/96; B01D 2252/20489; B01D 2252/20447; B01D 2257/504; B01D 2252/602; B01D 53/1425; B01D 53/1468; B01D 53/1493; B01D 2257/304; B01D 53/526
See application file for complete search history.

(56) References Cited

U.S. PATENT DOCUMENTS

| 4,051,144 | A | 9/1977 | Weinstock et al. |
| 2011/0008229 | A1 | 1/2011 | Iyengar et al. |
| 2015/0110695 | A1* | 4/2015 | Laroche ............ B01D 53/1493 423/228 |
| 2017/0021305 | A1* | 1/2017 | Laroche ................. C10K 1/143 |
| 2018/0221811 | A1 | 8/2018 | Vorberg et al. |
| 2018/0257022 | A1 | 9/2018 | Ingram et al. |
| 2018/0272270 | A1 | 9/2018 | Ingram et al. |
| 2018/0272271 | A1 | 9/2018 | Ingram et al. |
| 2018/0290101 | A1* | 10/2018 | Dugas ................ B01D 53/1425 |
| 2018/0304191 | A1 | 10/2018 | Ingram et al. |
| 2018/0311611 | A1 | 11/2018 | Vorberg et al. |
| 2019/0126193 | A1 | 5/2019 | Ingram et al. |

(Continued)

FOREIGN PATENT DOCUMENTS

EP  0339006 A1  10/1989
EP  2990090 A1  3/2016

(Continued)

OTHER PUBLICATIONS

U.S. Appl. No. 15/781,555.
International Preliminary Report on Patentability for PCT/EP2018/053235 dated Apr. 11, 2018.

*Primary Examiner* — Timothy C Vanoy
(74) *Attorney, Agent, or Firm* — Faegre Drinker Biddle & Reath LLP

(57) ABSTRACT

In a process for removal of acid gases from a fluid stream the fluid stream is contacted with an absorbent to obtain a treated fluid stream and a laden absorbent. The absorbent comprises a diluent and a compound of the general formula (I) wherein $R^1$ is $C_1$-$C_3$-alkyl; $R^2$ is $C_1$-$C_3$-alkyl; $R^3$ is selected from hydrogen and $C_1$-$C_3$-alkyl; and $R^4$ is selected from hydrogen and $C_1$-$C_3$-alkyl.

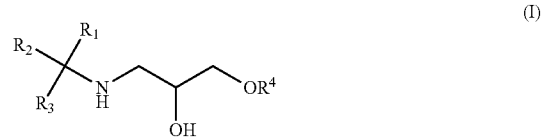

11 Claims, 4 Drawing Sheets

(56) References Cited

U.S. PATENT DOCUMENTS

| | | |
|---|---|---|
| 2019/0126194 A1 | 5/2019 | Ingram et al. |
| 2019/0143262 A1 | 5/2019 | Ingram et al. |
| 2020/0148824 A1* | 5/2020 | Delfort .............. C08G 73/0633 |

FOREIGN PATENT DOCUMENTS

| | | |
|---|---|---|
| KR | 20130035640 A | 4/2013 |
| KR | 20140115089 A | 9/2014 |
| WO | WO-2014004020 A1 | 1/2014 |

* cited by examiner

PROCESS FOR REMOVAL OF ACID GASES FROM A FLUID STREAM

CROSS-REFERENCE TO RELATED APPLICATIONS

This application is a national stage application (under 35 U.S.C. § 371) of PCT/EP2018/053235, filed Feb. 9, 2018, which claims benefit of European Application No, 17155535.2, filed Feb. 10, 2017.

The present invention relates to the use of an absorbent and to a process for removing acid gases from a fluid stream. In certain embodiments, the present invention relates to the selective removal of hydrogen sulfide from a fluid stream comprising carbon dioxide and hydrogen sulfide.

The removal of acid gases, for example $CO_2$, $H_2S$, $SO_2$, $CS_2$, HCN, COS or mercaptans, from fluid streams such as natural gas, refinery gas or synthesis gas is desirable for various reasons. Sulfur compounds in natural gas tend to form corrosive acids in particular together with the water frequently entrained by the natural gas. For the transport of the natural gas in a pipeline or further processing in a natural gas liquefaction plant (LNG=liquefied natural gas), given limits for the sulfur-containing impurities therefore have to be observed. In addition, numerous sulfur compounds are malodorous and toxic even at low concentrations and must meet environmental specifications.

Carbon dioxide has to be removed from natural gas because a high concentration of $CO_2$ reduces the calorific value of the gas. Moreover, $CO_2$ in conjunction with moisture can lead to corrosion in pipes and valves.

Known processes for removing acid gases include scrubbing operations with aqueous absorbent solutions of inorganic or organic bases. When acid gases are dissolved in the absorbent, ions form with the bases. The absorbent can be regenerated by decompression to a lower pressure and/or by stripping, whereby the ionic species react in reverse and the acid gases are released and/or stripped out by means of steam. After the regeneration process, the absorbent can be reused.

A process in which $CO_2$ and $H_2S$ are substantially removed is referred to as "total absorption". While removal of $CO_2$ may be necessary to avoid corrosion problems and provide the required heating value to the consumer, it is occasionally necessary or desirable to treat acid gas mixtures containing both $CO_2$ and $H_2S$ so as to remove the $H_2S$ selectively from the mixture while minimizing removal of the $CO_2$. Natural gas pipeline specifications, for example, set more stringent limits on the $H_2S$ level than on $CO_2$ since $H_2S$ is more toxic and corrosive than $CO_2$: common carrier natural gas pipeline specifications typically limit the $H_2S$ content to 4 ppmv with a more lenient limitation on the $CO_2$ at 2 vol %. Selective $H_2S$ removal is often desirable to enrich the $H_2S$ level in the feed to a sulfur recovery, such as a downstream Claus plant.

Severely sterically hindered secondary amines, such as 2-(2-tert-butylaminoethoxy)ethanol (TBAEE), and tertiary amines, such as methyldiethanolamine (MDEA), exhibit kinetic selectivity for $H_2S$ over $CO_2$. Such amines are therefore suitable for selective removal of $H_2S$ from gas mixtures comprising $CO_2$ and $H_2S$ and are generally utilized as aqueous mixtures. These amines do not react directly with $CO_2$; instead, $CO_2$ is reacted in a slow reaction with the amine and with water to give bicarbonate. The reaction kinetics allow $H_2S$ to react more rapidly with the amine groups of the sorbent to form a hydrosulfide salt in aqueous solution.

The use of hydroxyl-substituted amines (alkanolamines) such as those mentioned above has become common since the presence of the hydroxyl groups tends to improve the solubility of the absorbent/acid gas reaction products in the aqueous solvent systems widely used, so facilitating circulation of the solvent through the conventional absorber tower/regeneration tower unit. This preference may, however, present its own problems in certain circumstances. A current business driver is to reduce the cost to regenerate and to recompress acid gases prior to sequestration. For natural gas systems, the separation of the acid gases can occur at pressures of about 4,800 to 15,000 kPaa, more typically from about 7,250 to 8,250 kPaa. While the alkanolamines will effectively remove acid gases at these pressures, the selectivity for $H_2S$ removal can be expected to decrease markedly both by direct physisorption of the $CO_2$ in the liquid solvent and by reaction with the hydroxyl groups on the amine compound. Although the $CO_2$ reacts preferentially with the amino nitrogen, higher pressures force reaction with the oxygens and under the higher pressures, the bicarbonate/hemicarbonate/carbonate reaction product(s) formed by the reaction at the hydroxyl site is stabilized with a progressive loss in $H_2S$ selectivity with increasing pressure.

Although the presence of the hydroxyl groups improves the aqueous solubility of the amines, hydroxyl groups tend to impart surfactant properties to the absorbent/acid gas reaction products, thereby potentially causing troublesome foaming phenomena during the operation of the gas treatment unit. Also, alkanolamines such as 2-(2-tert-butylaminoethoxy)ethanol (TBAEE) may suffer from a noticeable volatility, causing absorbent losses during the operation of the gas treatment unit.

WO 2014/001664 A1 describes the use of 4-(aminoethyl) morpholine derivatives in the removal of acid gases from a fluid stream. The selective removal of hydrogen sulfide from a fluid stream comprising $CO_2$ and $H_2S$ is also described.

WO 2016/055258 describes the use of diamino derivatives of glycerol in the removal of acid gases from a fluid stream. The selective removal of hydrogen sulfide from a fluid stream comprising $CO_2$ and $H_2S$ is also described.

WO 2014/004020 A1 describes aqueous alkanolamine solutions comprising tert-amino derivatives of glycerol for the removal of acid gases from gas mixtures. The alkanolamine solutions are described as being effective at removing hydrogen sulfide from gaseous mixtures and/or removing acid gases at elevated operating temperatures.

It is an object of the invention to provide further processes suitable for removing acid gases from fluid streams. The processes are to be useful for applications in total absorption, where $CO_2$ and $H_2S$ are substantially removed, as well as for the selective removal of hydrogen sulfide from fluid streams. The absorbents used in the process are to have a high cyclic capacity and a low volatility.

The object is achieved by absorbent process for the removal of acid gases from a fluid stream wherein the fluid stream is contacted with an absorbent obtain a treated fluid stream and a laden absorbent, the absorbent comprising at least one diluent and a compound of the general formula (I)

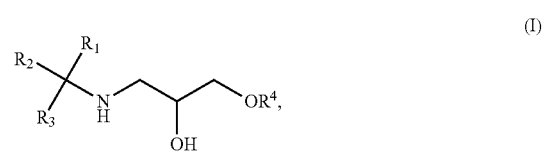

wherein $R^1$ is $C_1$-$C_3$-alkyl; $R^2$ is $C_1$-$C_3$-alkyl; $R^3$ is selected from hydrogen and $C_1$-$C_3$-alkyl; and $R^4$ is selected from hydrogen and $C_1$-$C_3$-alkyl. Preferably, $R^3$ is $C_1$-$C_3$-alkyl. Preferably, $R^4$ is hydrogen, methyl or ethyl, in particular hydrogen or methyl.

Compounds of the general formula (I) incorporate a hydroxyl group vicinal to a hydroxy or alkoxy group. While the hydroxyl group(s) effectively improve(s) the solubility of the absorbent/acid gas reaction products in an aqueous solvent system, it is believed that the electron-withdrawing effect of one hydroxyl group or the alkoxy group on the (other) hydroxyl group reduces the hydroxyl reactivity towards $CO_2$ that otherwise may result in a loss of $H_2S$ selectivity, particularly at higher pressure or higher loading.

In preferred embodiments, $R_1$ and $R_2$ are methyl and $R_3$ is hydrogen; or $R_1$, $R_2$ and $R_3$ are methyl; or $R_1$ and $R_2$ are methyl and $R_3$ is ethyl. In an especially preferred embodiment, $R_1$, $R_2$ and $R_3$ are methyl.

In a preferred embodiment, the compound of the general formula (I) is selected from 3-(tert-butylamino)propane-1,2-diol (TBAPD), 1-(tert-butylamino)-3-methoxy-propane-2-ol, 3-(iso-propylamino)propane-1,2-diol, and 3-[(2-methylbutan-2-yl)amino]propane-1,2-diol. In an especially preferred embodiment, the compound of the general formula (I) is 3-(tert-butylamino)propane-1,2-diol (TBAPD).

The compounds of the general formula (I) comprise a secondary amino group. The nitrogen atom in the secondary amino group has at least one secondary or tertiary carbon atom directly adjacent. The secondary amino group is thus sterically hindered.

The compounds of the general formula (I) are either commercially available or can be prepared in various ways. In one mode of preparation, glycidol can be reacted with a primary amine $R^1R^2R^3C$—$NH_2$, such as tert-butylamine.

Alternatively, glycerol can be reacted with a primary amine $R^1R^2R^3C$—$NH_2$, such as tert-butylamine. The reaction is suitably effected in the presence of hydrogen in the presence of a hydrogenation/dehydrogenation catalyst, for example of a copper-containing hydrogenation/dehydrogenation catalyst, at 160 to 220° C.

The absorbent comprises preferably 10% to 70% by weight, more preferably 15% to 65% by weight and most preferably 20% to 60% by weight of a compound of the general formula (I), based on the total weight of the absorbent.

The compound of the general formula (I) is diluted with a diluent, preferably a low-cost diluent. The diluent may be one that has only physical absorptivity for carbon dioxide and other constituents of the gas such as $H_2S$. Preferably, however, the diluent interacts with the acid-base chemistry of the process. In particular, the diluent is an aqueous diluent. Due to their steric hindrance, the compounds of the general formula (I) have no sufficiently nucleophilic amine site for a direct nucleophilic attack at the $CO_2$ molecule. Thus, the water oxygen acts as the nucleophile forming a Brønsted acid, $H_2CO_3$, which is neutralized by the compound of the general formula (I) acting as a Brønsted base to form an ammonium bicarbonate.

In one embodiment, the absorbent comprises at least one activator selected from a sterically unhindered primary amine and/or a sterically unhindered secondary amine. A sterically unhindered primary amine is understood to mean compounds having primary amino groups to which only a primary or a secondary carbon atom is bonded. A sterically unhindered secondary amine is understood to mean compounds having secondary amino groups to which only primary carbon atoms are bonded. Sterically unhindered primary amines or sterically unhindered secondary amines act as strong activators of $CO_2$ absorption. Accordingly, the presence of an activator may be desirable in applications directed at the non-selective removal of acid gases or applications in which the removal of $CO_2$ is especially important.

The activator preferably does not comprise acidic groups such as, in particular, phosphonic acid, sulfonic acid and/or carboxylic acid groups.

The activator is, for example, selected from alkanolamines such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine, polyamines such as hexamethylenediamine, 1,4-diaminobutane, 1,3-diaminopropane, 3-(methylamino)propylamine (MAPA), N-(2-hydroxyethyl)ethylenediamine, 3-(dimethyl-amino)propylamine (DMAPA), 3-(diethyl-amino)propylamine, N,N'-bis(2-hydroxyethyl)-ethylenediamine, 5-, 6- or 7-membered saturated heterocycles having at least one NH group in the ring, which may comprise one or two further heteroatoms selected from nitrogen and oxygen in the ring, such as piperazine, 2-methylpiperazine, N-methylpiperazine, N-ethyl-piperazine, N-(2-hydroxyethyl)piperazine, N-(2-aminoethyl)piperazine, homopiperazine, piperidine and morpholine.

Particular preference is given to 5-, 6- or 7-membered saturated heterocycles having at least one NH group in the ring, which may comprise one or two further heteroatoms selected from nitrogen and oxygen in the ring. Very particular preference is given to piperazine.

In another embodiment, the absorbent does not comprise any sterically unhindered primary amine or sterically unhindered secondary amine. Since sterically unhindered primary amines or sterically unhindered secondary amines act as strong activators of $CO_2$ absorption, their presence in the absorbent can result in a loss of the $H_2S$ selectivity of the absorbent. Accordingly, in applications where a high $H_2S$ selectivity is desirable, an absorbent essentially free of such compounds is preferable.

In one embodiment, the absorbent comprises a tertiary amine or severely sterically hindered primary amine and/or severely sterically hindered secondary amine other than the compounds of the general formula (I). Severe steric hindrance is understood to mean a tertiary carbon atom directly adjacent to a primary or secondary nitrogen atom. In this embodiment, the absorbent comprises the tertiary amine or severely sterically hindered amine other than the compounds of the general formula (I) generally in an amount of 5% to 50% by weight, preferably 10% to 40% by weight and more preferably 20% to 40% by weight, based on the total weight of the absorbent.

Suitable tertiary amines especially include:

1. Tertiary alkanolamines such as
bis(2-hydroxyethyl)methylamine(methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine(methyldiisopropanolamine, MDIPA);

2. Tertiary amino ethers such as
3-methoxypropyldimethylamine;

3. Tertiary polyamines, for example bis-tertiary diamines such as

N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N,N',N'-tetramethyl-1,6-hexanediamine, N,N-dimethyl-N',N'-diethylethylenediamine (DMDEEDA), 1-dimethylamino-2-dimethylaminoethoxyethane (bis[2-(dimethylamino)ethyl] ether), 1,4-diazabicyclo[2.2.2]octane (TEDA), tetramethyl-1,6-hexanediamine;

and mixtures thereof.

Tertiary alkanolamines, i.e. amines having at least one hydroxyalkyl group bonded to the nitrogen atom, are generally preferred. Particular preference is given to methyldiethanolamine (MDEA).

The suitable severely sterically hindered amines (i.e. amines having a tertiary carbon atom directly adjacent to a primary or secondary nitrogen atom) other than the compounds of the general formula (I) especially include:

1. Severely sterically hindered secondary alkanolamines such as 2-(2-tert-butylaminoethoxy)ethanol (TBAEE), 2-(2-tert-butylamino)propoxyethanol, 2-(2-tert-amylaminoethoxy) ethanol, 2-(2-(1-methyl-1-ethylpropylamino)ethoxy)ethanol, 2-(tert-butylamino)ethanol, 2-tert-butylamino-1-propanol, 3-tert-butylamino-1-propanol, 3-tert-butylamino-1-butanol, and 3-aza-2,2-dimethylhexane-1,6-diol;

2. Severely sterically hindered primary alkanolamines such as 2-amino-2-methylpropanol (2-AMP); 2-amino-2-ethylpropanol; and 2-amino-2-propylpropanol;

3. Severely sterically hindered amino ethers such as 1,2-bis(tert-butylaminoethoxy)ethane, bis(tert-butylaminoethyl) ether;

and mixtures thereof.

Severely sterically hindered secondary alkanolamines are generally preferred.

Particular preference is given to 2-(2-tert-butylaminoethoxy)ethanol and 2-N-methylamino-2-methylpropan-1-ol.

In one embodiment, the absorbent is an aqueous absorbent (which means that the diluent comprises water) and the absorbent additionally comprises an acid.

The acid helps to regenerate the absorbent to low loadings and enhance the efficiency of the process. Protonation equilibria form between the acid and the compound of general formula (I). The position of the equilibria is temperature-dependent, and the equilibrium is shifted at higher temperatures toward the free oxonium ion and/or the amine salt having the lower enthalpy of protonation. At relatively low temperatures as prevail in the absorption step, the higher pH promotes acid gas absorption, whereas, at relatively high temperatures as prevail in the desorption step, the lower pH supports the release of the absorbed acid gases.

The acid preferably has a $pK_A$ of less than 6, especially less than 5, measured at 25° C. under atmospheric pressure. In the case of acids having more than one dissociation stage and accordingly more than one $pK_A$, this requirement is met where one of the $pK_A$ values is within the range specified. The acid is suitably selected from protic acids (Brønsted acids).

The acid is preferably added in such an amount that the pH of the aqueous solution measured at 120° C. is 7.9 to less than 9.5, preferably 8.0 to less than 8.8, more preferably 8.0 to less than 8.5, most preferably 8.0 to less than 8.2.

The amount of acid, in one embodiment, is 0.1% to 5.0% by weight, preferably 0.2% to 4.5% by weight, more preferably 0.5% to 4.0% by weight and most preferably 1.0% to 2.5% by weight, based on the total weight of the absorbent.

The acid is selected from organic and inorganic acids. Suitable organic acids comprise, for example, phosphonic acids, sulfonic acids, carboxylic acids and amino acids. In particular embodiments, the acid is a polybasic acid.

Suitable acids are, for example, mineral acids such as hydrochloric acid, sulfuric acid, amidosulfuric acid, phosphoric acid, partial esters of phosphoric acid, for example mono- and dialkyl phosphates and mono- and diaryl phosphates such as tridecyl phosphate, dibutyl phosphate, diphenyl phosphate and bis(2-ethylhexyl)phosphate; boric acid;

carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethylhexanoic acid, pelargonic acid, caproic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positionally isomeric toluic acids, methoxybenzoic acids, chlorobenzoic acids, nitrobenzoic acids, phthalic acid, terephthalic acid, isophthalic acid; technical carboxylic acid mixtures, for example Versatic acids;

sulfonic acids such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalene-sulfonic acid and dinonylnaphthalenedisulfonic acid, trifluoromethyl- or nonafluoro-n-butylsulfonic acid, camphorsulfonic acid, 2-(4-(2-hydroxyethyl)-1-piperazinyl)-ethanesulfonic acid (HEPES);

organic phosphonic acids, for example phosphonic acids of the formula (IV)

$$R^4\text{—}PO_3H \qquad (IV)$$

in which $R^4$ is $C_{1-18}$-alkyl optionally substituted by up to four substituents independently selected from carboxyl, carboxamido, hydroxyl and amino.

These include alkylphosphonic acids such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids such as hydroxymethylphosphonic acid, 1-hydroxyethylphosphonic acid, 2-hydroxyethylphosphonic acid; arylphosphonic acids such as phenylphosphonic acid, tolylphosphonic acid, xylylphosphonic acid, amino-alkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid;

phosphonic acids of the formula (V)

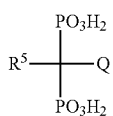

(V)

in which $R^5$ is H or $C_{1-6}$-alkyl, Q is H, OH or $NR^6_2$ and $R^6$ is H or $CH_2PO_3H_2$, such as 1-hydroxyethane-1,1-diphosphonic acid;

phosphonic acids of the formula (VI)

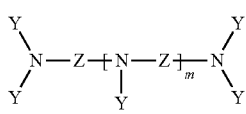

(VI)

in which Z is $C_{2-6}$-alkylene, cycloalkanediyl, phenylene, or $C_{2-6}$-alkylene interrupted by cycloalkanediyl or phenylene, Y is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid);

phosphonic acids of the formula (VII)

(VII)

in which $R^7$ is $C_{1-6}$-alkyl, $C_{2-6}$-hydroxyalkyl or $R^8$, and $R^8$ is $CH_2PO_3H_2$, such as nitrilotris(methylenephosphonic acid) and 2-hydroxyethyliminobis(methylenephosphonic acid);

aminocarboxylic acids having tertiary amino groups or amino groups having at least one secondary or tertiary carbon atom immediately adjacent to the amino group, such as α-amino acids having tertiary amino groups or amino groups having at least one secondary or tertiary carbon atom immediately adjacent to the amino group, such as N,N-dimethylglycine (dimethylaminoacetic acid), N,N-diethylglycine, alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (1-amino-2-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, N-methylserine, N,N-dimethylserine, 2-(methylamino) isobutyric acid, piperidine-2-carboxylic acid, N-methylpipendine-2-carboxylic acid, β-amino acids having tertiary amino groups or amino groups having at least one secondary or tertiary carbon atom immediately adjacent to the amino group, such as 3-dimethylaminopropionic acid, N-methyliminodipropionic acid, N-methylpiperidine-3-carboxylic acid, γ-amino acids having tertiary amino groups or amino groups having at least one secondary or tertiary carbon atom immediately adjacent to the amino group, such as 4-dimethylaminobutyric acid, or aminocarboxylic acids having tertiary amino groups or amino groups having at least one secondary or tertiary carbon atom immediately adjacent to the amino group, such as N-methylpipendine-4-carboxylic acid.

Among the inorganic acids, preference is given to phosphoric acid and sulfuric acid, especially sulfuric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4-tricarboxylic acid, 1-hydroxyethane-1,1-diphosphonic acid, ethylenediaminetetra(methylenephosphonic acid), diethylenetriaminepenta-(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

Among the aminocarboxylic acids having tertiary amino groups or amino groups having at least one secondary or tertiary carbon atom immediately adjacent to the amino group, preference is given to N,N-dimethylglycine and N-methylalanine.

More preferably, the acid is an inorganic acid.

In one embodiment, the diluent of the absorbent comprises at least one non-aqueous organic solvent. In particular cases, the diluent contains only a limited amount of water, or essentially no water in addition to the non-aqueous organic solvent. It may be desirable to limit the water content of the absorbent, for example to a maximum of 20% by weight, alternatively to a maximum of 10% by weight, preferably to a maximum of 5% by weight, or a maximum of 2% by weight.

The non-aqueous organic solvent is preferably selected from:

$C_4$-$C_{10}$ alcohols such as n-butanol, n-pentanol and n-hexanol;

ketones such as cyclohexanone;

esters such as ethyl acetate and butyl acetate;

lactones such as γ-butyrolactone, δ-valerolactone and ε-caprolactone;

amides such as tertiary carboxamides, for example N,N-dimethylformamide; or N-formylmorpholine and N-acetylmorpholine;

lactams such as γ-butyrolactam, δ-valerolactam and ε-caprolactam and N-methyl-2-pyrrolidone (NMP);

sulfones such as sulfolane;

sulfoxides such as dimethyl sulfoxide (DMSO);

glycols such as ethylene glycol (EG) and propylene glycol;

polyalkylene glycols such as diethylene glycol (DEG) and triethylene glycol (TEG);

di- or mono($C_{1-4}$-alkyl ether)glycols such as ethylene glycol dimethyl ether;

di- or mono($C_{1-4}$-alkyl ether) polyalkylene glycols such as diethylene glycol dimethyl ether, dipropylene glycol monomethyl ether and triethylene glycol dimethyl ether;

cyclic ureas such as N,N-dimethylimidazolidin-2-one and dimethylpropyleneurea (DMPU);

thioalkanols such as ethylenedithioethanol, thiodiethylene glycol (thiodiglycol, TDG) and methylthioethanol;

and mixtures thereof.

More preferably, the non-aqueous solvent is selected from sulfones, glycols and polyalkylene glycols. Most preferably, the non-aqueous solvent is selected from sulfones. A preferred non-aqueous solvent is sulfolane.

The absorbent may also comprise additives such as corrosion inhibitors, enzymes, antifoams, etc. In general, the amount of such additives is in the range from about 0.005% to 3%, based on the total weight of the absorbent.

The present invention also relates to the use of the absorbent described herein for removal of acid gases from a fluid stream.

In one embodiment, the present invention relates to the use of the absorbent described herein for the non-selective removal of acid gases from a fluid stream. In this case, it is preferred that the absorbent comprises at least one activator selected from a sterically unhindered primary amine and/or a sterically unhindered secondary amine, as described above.

In another embodiment, the present invention relates to the use of the absorbent described herein for the selective removal of hydrogen sulfide from a fluid stream comprising carbon dioxide and hydrogen sulfide. In this case, it is preferred that the absorbent does not comprise any sterically unhindered primary amine or sterically unhindered secondary amine.

In one embodiment, the process is a process for the non-selective removal of acid gases from a fluid stream. In this case, it is preferred that the absorbent comprises at least one activator selected from a sterically unhindered primary amine and/or a sterically unhindered secondary amine, as described above.

In another embodiment, the process is a process for the selective removal of hydrogen sulfide from a fluid stream comprising carbon dioxide and hydrogen sulfide. In this case, it is preferred that the absorbent does not comprise any sterically unhindered primary amine or sterically unhindered secondary amine.

In the present context, "selectivity for hydrogen sulfide" is understood to mean the value of the following quotient:

$$\frac{\frac{mol\,(H_2S)}{mol\,(CO_2)}\,\text{liquid phase}}{\frac{mol\,(H_2S)}{mol\,(CO_2)}\,\text{gas phase}}$$

where $\frac{mol\,(H_2S)}{mol\,(CO_2)}$ liquid phase is the molar $H_2S/CO_2$ ratio in a liquid phase which is in contact with a gas phase and $\frac{mol\,(H_2S)}{mol\,(CO_2)}$ gas phase is the molar $H_2S/CO_2$ ratio in the gas phase. In a standard gas scrubbing process, the liquid phase is the laden absorbent at the bottom of the absorber and the gas phase is the fluid stream to be treated.

A process is understood to be $H_2S$ selective when the value of the above quotient is greater than 1. When the process is a process for the selective removal of hydrogen sulfide from a fluid stream comprising carbon dioxide and hydrogen sulfide, the selectivity for hydrogen sulfide is preferably at least 1.1, even more preferably at least 2 and most preferably at least 4.

The absorbent described herein is suitable for treatment of all kinds of fluids. Fluids are firstly gases such as natural gas, synthesis gas, coke oven gas, cracking gas, coal gasification gas, cycle gas, landfill gases and combustion gases, and secondly liquids that are essentially immiscible with the absorbent, such as LPG (liquefied petroleum gas) or NGL (natural gas liquids). The process of the invention is particularly suitable for treatment of hydrocarbonaceous fluid streams. The hydrocarbons present are, for example, aliphatic hydrocarbons such as $C_1$-$C_4$ hydrocarbons such as methane, unsaturated hydrocarbons such as ethylene or propylene, or aromatic hydrocarbons such as benzene, toluene or xylene.

The absorbent of the invention is suitable for removal of acid gases, for example $CO_2$, $H_2S$, $SO_3$, $SO_2$, $CS_2$, HCN, COS and mercaptans. It is also possible for other acidic gases to be present in the fluid stream, such as COS and mercaptans.

The absorbent is suitable for selective removal of hydrogen sulfide from a fluid stream comprising carbon dioxide and hydrogen sulphide and allows high $H_2S$ cleanup selectively at low solvent circulation rates. The absorbent is useful in sulfur plant Tail Gas Treating Unit (TGTU) applications, in Acid-Gas Enrichment (AGE) processes to upgrade lean acid offgas from treating units to higher-quality Claus plant feed, or for the treatment of associated gases and refinery gases.

In the process of the invention, the fluid stream is contacted with the absorbent in an absorption step in an absorber, as a result of which carbon dioxide and hydrogen sulfide are at least partly scrubbed out. This gives a $CO_2$- and $H_2S$-depleted fluid stream and a $CO_2$- and $H_2S$-laden absorbent.

The absorber used is a scrubbing apparatus used in customary gas scrubbing processes. Suitable scrubbing apparatuses are, for example, random packings, columns having structured packings and having trays, membrane contactors, radial flow scrubbers, jet scrubbers, Venturi scrubbers and rotary spray scrubbers, preferably columns having structured packings, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of packings to reduce pressure drops in the gas flow. There are various designs of structured packings, for example woven packings or sheet metal packings. Materials used may be metal, plastic, glass and ceramic.

The temperature of the absorbent in the absorption step is generally about 30 to 100° C., and when a column is used is, for example, 30 to 70° C. at the top of the column and 50 to 100° C. at the bottom of the column.

The process of the invention may comprise one or more, especially two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The person skilled in the art can achieve a high level of hydrogen sulfide removal with a defined selectivity by varying the conditions in the absorption step, such as, more particularly, the absorbent/fluid stream ratio, the column height of the absorber, the type of contact-promoting internals in the absorber, such as random packings, trays or structured packings, and/or the residual loading of the regenerated absorbent.

Since $CO_2$ is absorbed more slowly than $H_2S$, more $CO_2$ is absorbed in a longer residence time than in a shorter residence time. Conversely in longer residence time $H_2S$ selectivity is decreased. A higher column therefore brings about a less selective absorption. Trays or structured packings with relatively high liquid holdup likewise lead to a less selective absorption. The heating energy introduced in the regeneration can be used to adjust the residual loading of the regenerated absorbent. A lower residual loading of regenerated absorbent leads to improved absorption.

The process preferably comprises a regeneration step in which the $CO_2$- and $H_2S$-laden absorbent is regenerated. In the regeneration step, $CO_2$ and $H_2S$ and optionally further acidic gas constituents are released from the $CO_2$- and $H_2S$-laden absorbent to obtain a regenerated absorbent. Preferably, the regenerated absorbent is subsequently recycled into the absorption step. In general, the regeneration step comprises at least one of the measures of heating, decompressing and stripping with an inert fluid.

The regeneration step preferably comprises heating of the absorbent laden with the acidic gas constituents, for example by means of a boiler, natural circulation evaporator, forced circulation evaporator or forced circulation flash evaporator. The absorbed acid gases are stripped out by means of the steam obtained by heating the solution. Rather than steam, it is also possible to use an inert fluid such as nitrogen. The absolute pressure in the desorber is normally 0.1 to 3.5 bar, preferably 1.0 to 2.5 bar. The temperature is normally 50° C. to 170° C., preferably 80° C. to 130° C., the temperature of course being dependent on the pressure. In some cases an additional regeneration step of a slip stream of the regenerated absorption solvent is needed. In the presence of SOx, NOx, and CO in the fluid stream heat stable salts like sulfates, nitrates, and formates can be formed. To the lower the concentration of these undesired components a further distillation step at elevated temperatures can be applied, or alternatively the heat stable salts can be removed by ion exchange process.

The regeneration step may alternatively or additionally comprise a decompression. This includes at least one decompression of the laden absorbent from a high pressure as exists in the conduction of the absorption step to a lower pressure. The decompression can be accomplished, for example, by means of a throttle valve and/or a decompression turbine. Regeneration with a decompression stage is described, for example, in publications U.S. Pat. Nos. 4,537,753 and 4,553,984.

The acidic gas constituents can be released in the regeneration step, for example, in a decompression column, for example a flash vessel installed vertically or horizontally, or a countercurrent column with internals.

The regeneration column may likewise be a column having random packings, having structured packings or having trays. The regeneration column, at the bottom, has a heater, for example a forced circulation evaporator with circulation pump. At the top, the regeneration column has an outlet for the acid gases released. Entrained absorption medium vapors are condensed in a condenser and recirculated to the column.

It is possible to connect a plurality of decompression columns in series, in which regeneration is effected at different pressures. For example, regeneration can be effected in a preliminary decompression column at a high pressure typically about 1.5 bar above the partial pressure of the acidic gas constituents in the absorption step, and in a main decompression column at a low pressure, for example 1 to 2 bar absolute. Regeneration with two or more decompression stages is described in publications U.S. Pat. Nos. 4,537,753, 4,553,984, EP 0 159 495, EP 0 202 600, EP 0 190 434 and EP 0 121 109.

The invention is illustrated in detail by the appended drawings and the examples which follow.

Figure 1:
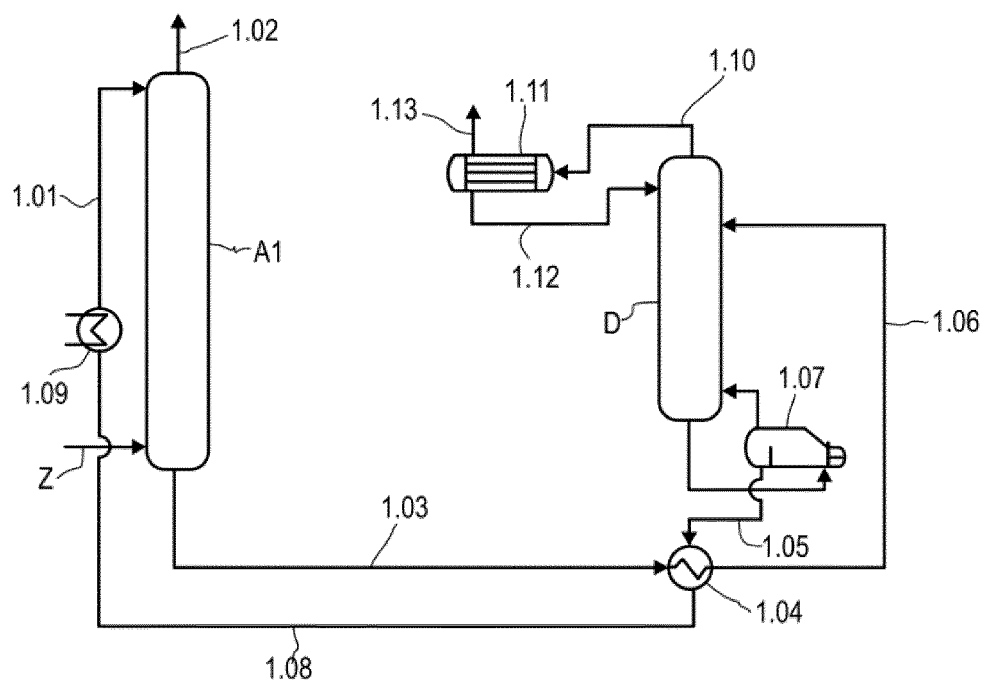
FIG. 1 is a schematic diagram of a plant suitable for performing the process of the invention.

According to FIG. 1, via the inlet Z, a suitably pre-treated gas comprising hydrogen sulfide and carbon dioxide is contacted in countercurrent, in an absorber A1, with regenerated absorbent which is fed in via the absorbent line 1.01. The absorbent removes hydrogen sulfide and carbon dioxide from the gas by absorption; this affords a hydrogen sulfide- and carbon dioxide-depleted clean gas via the offgas line 1.02.

Via the absorbent line 1.03, the heat exchanger 1.04 in which the $CO_2$- and $H_2S$-laden absorbent is heated up with the heat from the regenerated absorbent conducted through the absorbent line 1.05, and the absorbent line 1.06, the $CO_2$- and $H_2S$-laden absorbent is fed to the desorption column D and regenerated.

Between the absorber A1 and heat exchanger 1.04, one or more flash vessels may be provided (not shown in FIG. 1), in which the $CO_2$- and $H_2S$-laden absorbent is decompressed to, for example, 3 to 15 bar.

From the lower part of the desorption column D, the absorbent is conducted into the boiler 1.07, where it is heated. The steam that arises is recycled into the desorption column D, while the regenerated absorbent is fed back to the absorber A1 via the absorbent line 1.05, the heat exchanger 1.04 in which the regenerated absorbent heats up the $CO_2$- and $H_2S$-laden absorbent and at the same time cools down itself, the absorbent line 1.08, the cooler 1.09 and the absorbent line 1.01. Instead of the boiler shown, it is also possible to use other heat exchanger types for energy introduction, such as a natural circulation evaporator, forced circulation evaporator or forced circulation flash evaporator. In the case of these evaporator types, a mixed-phase stream of regenerated absorbent and steam is returned to the bottom of desorption column D, where the phase separation between the vapour and the absorbent takes place. The regenerated absorbent to the heat exchanger 1.04 is either drawn off from the circulation stream from the bottom of the desorption column D to the evaporator or conducted via a separate line directly from the bottom of the desorption column D to the heat exchanger 1.04.

The $CO_2$- and $H_2S$-containing gas released in desorption column D leaves the desorption column D via the offgas line 1.10. It is conducted into a condenser with integrated phase separation 1.11, where it is separated from entrained absorbent vapour. In this and all the other plants suitable for performance of the process of the invention, condensation and phase separation may also be present separately from one another. Subsequently, the condensate is conducted through the absorbent line 1.12 into the upper region of desorption column D, and a $CO_2$- and $H_2S$-containing gas is discharged via the gas line 1.13.

Figure 4:
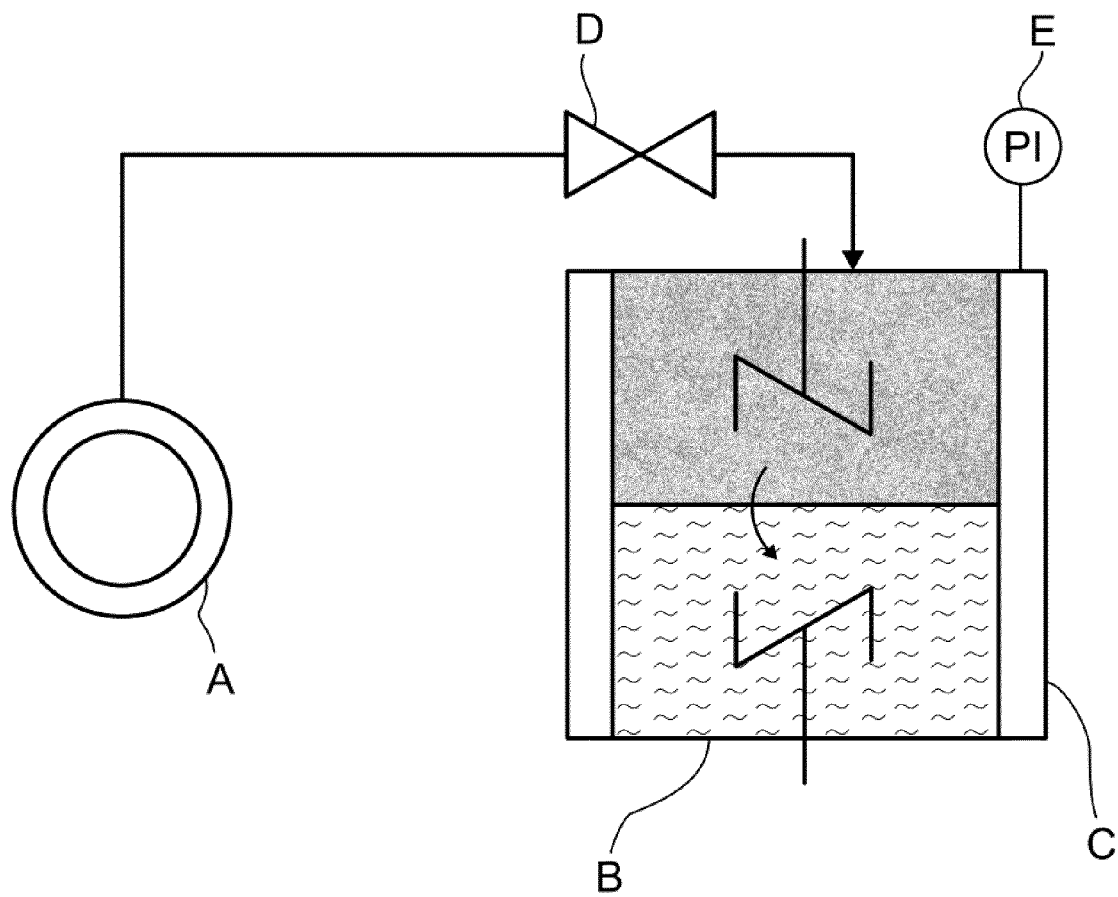
FIG. 4 is a schematic diagram of a twin stirred cell arrangement used to determine the relative $CO_2$ absorption rates of absorbents.

In FIG. 4, the following reference symbols are used: A=$CO_2$ storage vessel, B=twin stirred cell, C=temperature regulator, D=metering valve, E=manometer. According to FIG. 4, a liquid phase of the absorbent to be tested is present in the lower part of the twin stirred cell B, and is in contact with the gas phase above it via a phase boundary. The liquid and gas phase can each be mixed with a stirrer. The twin stirred cell B is connected to the $CO_2$ storage vessel A via a metering valve D. The pressure that exists in the twin stirred cell B can be determined by means of the manometer E. In the measurement, the volume flow rate of carbon dioxide is recorded, the volume flow rate being adjusted such that a constant pressure exists in twin stirred cell B.

In the description of the examples, the following abbreviations were used:
DMAPD: 3-(dimethylamino)-1,2-propanediol
M3ETB: (2-(2-(2-tert-butylaminoethoxy)ethoxy)ethyl) methyl ether
MDEA: methyldiethanolamine
TBA: tert-butylamine
TBAEE: 2-(2-tert-butylaminoethoxy)ethanol
TBAPD: 3-(tert-butylamino)propane-1,2-diol

EXAMPLE 1

Preparation of 3-(tert-butylamino)propane-1,2-diol (TBAPD)

1,000 mL of absolute ethanol, denatured with toluene, were filled into a 4 L round bottom flask, equipped with an overhead stirrer. The flask was placed in an ice bath. 438 g (6.0 mol) of tert-butylamine (TBA) was added and thoroughly mixed with the ethanol. After the solution had cooled to 1° C., 222 g of glycidol (3.0 mol) were added continuously over 60 min using a dropping funnel. The temperature inside the flask was kept at 1 to 3° C. After the addition was complete, the ice bath was removed, and the content was allowed to warm to room temperature under intense stirring. After three hours reaction time, a sample was taken and analyzed by gas chromatography. The reaction mixture was stirred for a further 20 h at room temperature and then for 6 h at 47° C. After this period, conversion was complete. Excess TBA was removed in vacuo and the crude product was purified by distillation over a 10 cm distillation column and Claisen bridge (0.7 mbar, 93 to 95° C. head temperature). The yield of TBAPD was 302 g (68.4%), and the purity by GC was 99.8%.

Gas chromatography was performed with a column type DB1 by Agilent, length 30 m, diameter 0.25 mm, layer thickness 1 μm. The temperature program was: 8 min at 60° C., 10° C./min to 280° C., and 35 min at 280° C.

EXAMPLE 2

Comparison of Absorption Properties of MDEA and TBAPD

The experiments were carried out in an absorption unit (semi-batch system), comprising a stirred autoclave to which gas could be fed in up-flow mode, and a condenser. The autoclave was equipped with a pressure gage and a type J thermocouple. A safety rupture disc was attached to the autoclave head. A high wattage ceramic fiber heater was used to supply heat to the autoclave. The gas flows were regulated by mass flow controllers (from Brooks Instrument) and the temperature of the condenser was maintained by a chiller. The maximum working pressure and temperature were 1000 psi (69 bar) and 350° C., respectively.

During runs at atmospheric pressure, the pH of the solution was monitored in situ by using a pH probe (from Cole-Parmer), which was installed in the bottom of the autoclave. This pH probe was limited by a maximum temperature and pressure of 135° C. and 100 psi, respectively. Therefore, before carrying out experiments at a pressure above atmospheric pressure ("higher pressure"), the pH probe was removed and the autoclave was capped. In both cases (atmospheric pressure and higher pressure), liquid samples were collected by directly attaching a vial (atmospheric pressure) or a stainless steel cylinder filled with caustic (higher pressure) to the sampling system. A specifically designed LabVIEW program was used to control the absorption unit operation and to acquire experimental data like temperature, pressure, stirrer speed, pH (at atmospheric pressure), gas flow rate and off-gas concentration.

The gas mixture used in the examples had the following properties:
Gas feed composition: 10 mol-% $CO_2$, 1 mol-% $H_2S$, 89 mol-% $N_2$
Gas flow rate: 154 SCCM
Temperature: 40.8° C.
Pressure: 1 bar
Volume: 15 mL (T=0.1 min)
Stirring rate: 200 rpm The experiments of example 2 were performed by flowing gas mixtures as specified above through the autoclave.

The autoclave was previously loaded with the respective aqueous amine solution, as specified below:

| amine | molar weight [g/mol] | molarity [mol$_{amine}$/L] | amount of amine [weight-%] | molar ratio H$_2$O:amine |
|---|---|---|---|---|
| MDEA | 119.2 | 2.17 | 26 | 18.8 |
| TBAPD | 147.2 | 2.17 | 32 | 17.4 |

The acid gas mixture was fed to the bottom of the reactor. The gases leaving the autoclave were passed through the condenser, which was kept at 10° C., in order to remove any entrained liquids. A slip-stream of the off-gas leaving the condenser was fed to a micro-gas-phase chromatograph (micro-GC, from Inficon) for analysis while the main gas flow passed through a scrubber. After reaching breakthrough, nitrogen was used to purge the system.

The slip-stream of the off-gas was analyzed using a custom-built micro-GC. The micro-GC was configured as a refinery gas analyzer and included 4 columns (Mole Sieve, PLOT U, OV-1, PLOT Q) by Aglient and 4 thermal conductivity detectors. A portion of the off-gas was injected into the micro-GC approximately every 2 min. A small internal vacuum pump was used to transfer the sample into the micro-GC. The nominal pump rate was approximately 20 mL/min in order to achieve 10× the volume of line flushes between the sample tee and the micro-GC. The actual amount of gas injected into the GC was approximately 1 μL. The PLOT U column was used to separate and identify H$_2$S and CO$_2$, and the micro-TCD was used to quantify them.

Figure 2:
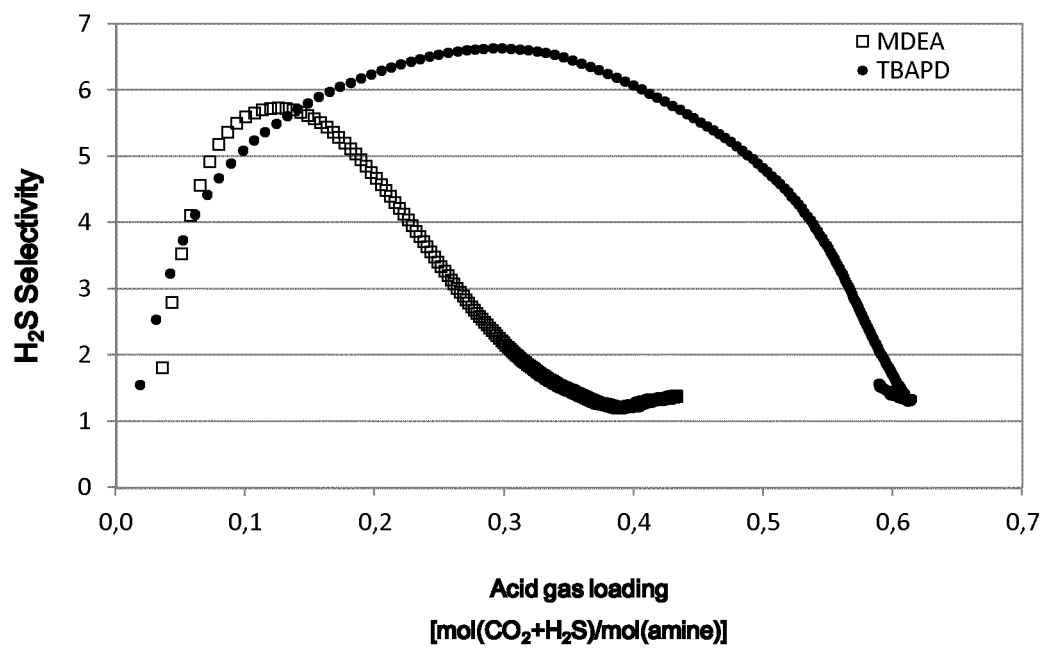
FIG. 2 is a plot of the selectivity of $H_2S$ over $CO_2$ as a function of acid gas loading of an aqueous solution of methyldiethanolamine (MDEA, 26 weight-%) and an aqueous solution of 3-(tert-butylamino)propane-1,2-diol (TBAPD, 32 weight-%).
Figure 3:
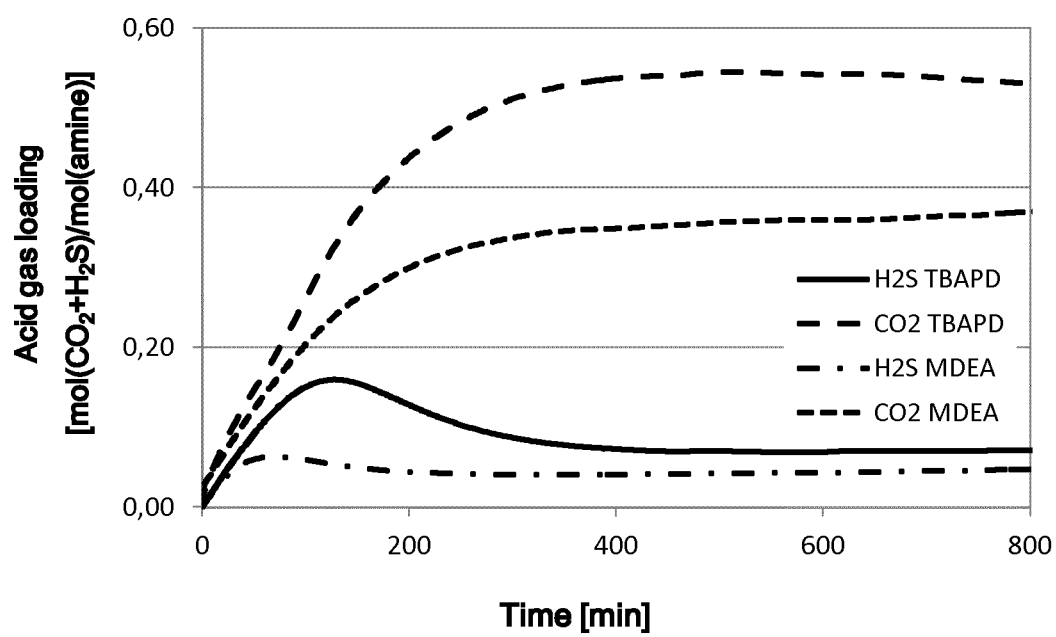
FIG. 3 is a plot of the acid gas loading over time of an aqueous solution of methyldiethanolamine (MDEA, 26 weight-%) and an aqueous solution of 3-(tert-butylamino)propane-1,2-diol (TBAPD, 32 weight-%).

The results are shown in FIGS. 2 and 3. The term "acid gas loading" as used herein stands for the concentration of the H$_2$S and CO$_2$ gases physically dissolved and chemically combined in the absorbent solution as expressed in moles of gas per moles of the amine.

Aqueous MDEA has a maximum selectivity of about 5.8 at a loading of about 0.15 moles. The selectivity declines at higher H$_2$S and CO$_2$ loadings. In comparison, aqueous TBAPD has a maximum selectivity of about 6.5, with the maximum shifted to higher loadings of about 0.30 moles.

The acid gas loading of aqueous MDEA over time shows a maximum CO$_2$ loading of about 0.38 moles of CO$_2$ per mole of amine after about 800 minutes, while the H$_2$S loading rises to a maximum of about 0.05 moles of H$_2$S per mole of amine after about 50 minutes, afterwards falling slightly to about 0.04 moles of H$_2$S per mole of amine at about 200 minutes and remaining essentially steady afterwards. Probably, bound H$_2$S is displaced by CO$_2$ at higher loadings/longer residence times. Aqueous TBAPD shows a maximum CO$_2$ loading of about 0.55 moles of CO$_2$ per mole of amine after about 800 minutes, while the final H$_2$S loading is about 0.08 moles of H$_2$S per mole of amine at about 400 minutes.

EXAMPLE 3

Cyclic Capacity of MDEA, TBAEE and TBAPD

A loading experiment and then a stripping experiment were conducted.

A glass condenser, which was operated at 5° C., was attached to a glass cylinder with a temperature-regulated jacket. This prevented distortion of the test results by partial evaporation of the absorbent. The glass cylinder was initially charged with about 100 mL of unladen absorbent (30% by weight of amine in water). To determine the absorption capacity, at ambient pressure and 40° C., 8 L (standard temperature and pressure, STP)/h of CO$_2$ or H$_2$S were passed through the absorption liquid via a frit over a period of about 4 h. Subsequently, the loading of CO$_2$ or H$_2$S was determined as follows.

The determination of H$_2$S was effected by titration with silver nitrate solution. For this purpose, the sample to be analysed was weighed into an aqueous solution together with about 2% by weight of sodium acetate and about 3% by weight of ammonia. Subsequently, the H$_2$S content was determined by a potentiometric turning point titration by means of silver nitrate. At the turning point, the H$_2$S is fully bound as Ag$_2$S. The CO$_2$ content was determined as total inorganic carbon (TOC-V Series Shimadzu).

The laden solution was stripped by heating an identical apparatus setup to 80° C., introducing the laden absorbent and stripping it by means of an N$_2$ stream (8 L (STP)/h). After 60 min, a sample was taken and the CO$_2$ or H$_2$S loading of the absorbent was determined as described above.

The difference in the loading at the end of the loading experiment and the loading at the end of the stripping experiment gives the respective cyclic capacity.

The results are shown in the following table:

| | Absorbent | | | | | |
|---|---|---|---|---|---|---|
| | CO$_2$ loading [mol$_{CO2}$/mol$_{amine}$] | | | H$_2$S loading [mol$_{CO2}$/mol$_{amine}$] | | Cyclic |
| Composition | after loading | after stripping | Cyclic CO$_2$ capacity [mol$_{CO2}$/mol$_{amine}$) | after loading | after stripping | H$_2$S capacity [mol$_{H2S}$/mol$_{amine}$] |
| 30 wt.-% MDEA + 70% wt.-% H$_2$O* | 0.77 | 0.05 | 0.72 | 0.68 | 0.11 | 0.57 |
| 30 wt.-% TBAEE + 70% wt.-% H$_2$O* | 0.97 | 0.24 | 0.73 | n.d.** | n.d.** | n.d.** |
| 30% wt.-% TBAPD + 70% wt.-% H$_2$O | 0.94 | 0.11 | 0.83 | 0.91 | 0.12 | 0.79 |

*comparative example
**n.d. = not determined

It is clear that TBAPD shows a higher cyclic CO$_2$ capacity than MDEA and TBAEE and a higher H$_2$S capacity than MDEA.

EXAMPLE 4

Volatility

The volatility of M3ETB, TBAPD, MDEA and TBAEE in 30% by weight aqueous solutions was examined.

The same apparatus as in example 3 was used, except that the condensate obtained in the glass condenser was not returned to the glass condenser but was separated and analyzed for its composition after the experiment had ended via gas chromatography and Karl Fischer titration. The glass cylinder was regulated to 50° C., and 200 mL of the absorbent were introduced in each case. Over an experimental duration of 8 h, 30 L (STP)/h of $N_2$ were passed through the absorbent at ambient pressure.

The experiments were repeated three times. The obtained average values are shown in the following table:

| Solution | Condensate [mL] | Water [wt.-%] | Amine [wt.-%] |
|---|---|---|---|
| 30 wt.-% M3ETB + 70% wt.-% $H_2O$* | 30.1 | 99.2 | 0.7 |
| 30% wt.-% TBAEE + 70% wt.-% $H_2O$* | 30.0 | 99.3 | 0.7 |
| 30 wt.-% MDEA + 70% wt.-% $H_2O$* | 27.1 | 99.4 | 0.7 |
| 30 wt.-% TBAPD + 70% wt.-% $H_2O$ | 34.1 | 99.4 | 0.4 |

*comparative example

It is clear that TBAPD has a lower volatility compared to the M3ETB, TBAEE and MDEA.

EXAMPLE 5

$pK_A$ Values

The pKa value of the amino groups of TBAPD and MDEA were determined by titration with at 20° C. An aqueous amine solution (0.005 mol/L) was titrated with hydrochloric acid (0.1 mol/L). The results are shown in the following table:

|  | TBAPD | MDEA* |
|---|---|---|
| $pK_A$ | 10.0 | 8.7 |

*comparative example

It is clear that the $pK_A$ value of TBAPD is greater than that of MDEA. It is believed that a high $pK_A$ value at relatively low temperatures (such as 20° C.) as exist in the absorption step promotes efficient acid gas absorption.

EXAMPLE 6

Comparison of Absorption Properties of Aqueous Solutions of MDEA, TBAPD and DMAPD Comprising Piperazine In a twin stirred cell (TSC) according to FIG. 4, the relative $CO_2$ absorption rates of aqueous absorbents were measured.

The twin stirred cell had an internal diameter of 85 mm and a volume of 509 mL. The temperature of the cell was kept at 50° C. during the measurements. In order to mix the gas and liquid phases, the cell according to FIG. 4 comprised two stirrers. Before commencement of the measurement, the twin stirred cell was evacuated. A defined volume of degassed absorbent was added to the twin stirred cell and the temperature was regulated at 50° C. The stirrers were already switched on during the heating of the unladen absorbent. The stirrer speed was selected such that a planar phase boundary formed between the liquid phase and gas phase. Development of waves at the phase interface has to be avoided since there would otherwise be no defined phase interface. After the desired experimental temperature had been attained, carbon dioxide was introduced into the reactor by means of a metering valve. The volume flow rate was controlled such that the $CO_2$ partial pressure was constant at 50 mbar over the entire experiment. With increasing experimental duration, the volume flow rate decreased since the absorbent became saturated over time and the absorption rate decreased. The volume flow rate was recorded over the entire period. The experiment was ended as soon as no further carbon dioxide flowed into the twin stirred cell. The absorbent was in an equilibrium state at the end of the experiment.

For the evaluation of the experiments, the absorption rate in (mol of $CO_2$)/[($m^3$ of absorption medium)×min] was determined as a function of the loading of the absorption medium. The absorption rate was calculated from the recorded volumetric flow rate of carbon dioxide and the volume of absorption medium in the twin stirred cell. The loading was determined from the cumulative amount of carbon dioxide which had been fed into the twin stirred cell and the mass of absorption medium in the twin stirred cell. Further, the maximum loading at the end of the experiment was determined.

The median absorption rates were determined as follows: starting from the maximum loading of the absorption medium (virtually equilibrium state at a $CO_2$ partial pressure of 50 mbar and a temperature of 50° C.) the absorption rates were determined at 75%, 50% and 20% loading of the maximum loading and the mean was determined. Absorption rates at less than 20% loading were not taken into account in the taking of the mean, since the absorption medium in the industrial process passes into the absorption apparatus with a residual loading of $CO_2$.

The following aqueous solutions were examined: 5 wt.-% piperazine and 30 wt.-% MDEA, 5 wt.-% piperazine and 30 wt.-% DMAPD, and 5 wt.-% piperazine and 30 wt.-% TBAPD. The results are shown in the following table:

| Aqueous solution | Relative median absorption rate** | Maximum loading [$Nm^3$/t solvent] |
|---|---|---|
| 5 wt.-% piperazine + 30 wt.-% MDEA* | 100% | 17 |
| 5 wt.-% piperazine + 30 wt.-% DMAPD* | 119% | 22 |
| 5 wt.-% piperazine + 30 wt.-% TBAPD | 142% | 31 |

*comparative example
**based on a solution of 5 wt.-% piperazine and 30 wt.-% MDEA It is clear that the absorption rate of the aqueous solution comprising TBAPD is significantly higher than that of the solutions comprising MDEA and DMAPD, respectively. Further, the maximum loading of the aqueous solution comprising TBAPD is higher than that of the solutions comprising MDEA and DMAPD, respectively.

EXAMPLE 7

Synthesis of 1-tert-butylamino-3-methoxy-propane-2-ol

A 250 mL 4-necked flask equipped with a cooler, magnetic stirrer and thermometer, was charged with tert-butylamine (tBA, 34.9 g) and water (9 mL) and the mixture was heated to 55° C. Then, glycidol methyl ether (45.0 g) was added drop-wise. The reaction mixture was heated to 65° C. The reaction was exothermic and the mixture boiled at 89° C. When no further heat evolved, the mixture was stirred for another 3 hrs at 65° C.

Workup: Excess tBA was removed in vacuo. Remaining mass 71.7 g, the product was isolated with a purity of 97% by temperature ramp gas chromatography. The yield was 99.6% of theory. The column used for gas chromatography was a DB1 with a length of 30 m, a diameter of 0.25 mm and a film thickness of 0.25 um by Agilent. The temperature ramp profile was as follows: Injection at 60° C., increasing the temperature at a rate of 15° C./min until a temperature of 280° C. was reached. This temperature was held for a further 1 minute.

1H NMR (400 MHz, Deuterium Oxide) δ 3.91-3.74 (m, 1H), 3.58-3.42 (m, 2H), 3.39 (s, 3H), 2.73-2.49 (m, 2H), 1.11 (s, 9H).

The invention claimed is:

1. A process for removing acid gases from a fluid stream, wherein the fluid stream is contacted with an absorbent obtain a treated fluid stream and a laden absorbent, the absorbent comprising at least one diluent and a compound of the general formula (I)

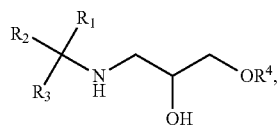

wherein $R^1$ is $C_1$-$C_3$-alkyl; $R^2$ is $C_1$-$C_3$-alkyl; $R^3$ is selected from hydrogen and $C_1$-$C_3$-alkyl; and $R^4$ is selected from hydrogen and $C_1$-$C_3$-alkyl.

2. The process according to claim 1, wherein $R^3$ is $C_1$-$C_3$-alkyl.

3. The process according to claim 1, wherein the compound of the general formula (I) is selected from 3-(tert-butylamino)propane-1,2-diol, 1-(tert-butylamino)-3-methoxy-propane-2-ol, 3-(iso-propylamino)propane-1,2-diol, and 3-[(2-methylbutan-2-yl)amino]propane-1,2-diol.

4. The process according to claim 1, wherein the diluent comprises water.

5. The process according to claim 4, wherein the absorbent additionally comprises an acid.

6. The process according to claim 1, wherein the diluent comprises a non-aqueous organic solvent.

7. The process according to claim 6, wherein the organic solvent is selected from $C_{4-10}$ alcohols, ketones, esters, lactones, amides, lactams, sulfones, sulfoxides, glycols, polyalkylene glycols, di- or mono($C_{1-4}$-alkyl ether)glycols, di- or mono($C_{1-4}$-alkyl ether) polyalkylene glycols, cyclic ureas, thioalkanols and mixtures thereof.

8. The process according to claim 1, wherein the absorbent comprises at least one activator selected from a sterically unhindered primary amine and/or a sterically unhindered secondary amine.

9. The process according to claim 8, wherein the activator is piperazine.

10. The process according to claim 1, for selective removal of hydrogen sulfide from a fluid stream comprising carbon dioxide and hydrogen sulfide.

11. The process according to claim 1, wherein the laden absorbent is regenerated by means of at least one of the measures of heating, decompressing and stripping with an inert fluid.

* * * * *